United States Patent
Mayumi (10) Patent No.: US 7,095,148 B2
(45) Date of Patent: Aug. 22, 2006

(54) MOTOR WITH IMPROVED ROTARY SHAFT SUPPORTING STRUCTURE

(75) Inventor: Eiji Mayumi, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 291 days.

(21) Appl. No.: 10/683,879

(22) Filed: Oct. 9, 2003

(65) Prior Publication Data

US 2005/0225185 A1    Oct. 13, 2005

(30) Foreign Application Priority Data

Oct. 17, 2002  (JP)  .............................. 2002-302964
Oct. 17, 2002  (JP)  .............................. 2002-302965

(51) Int. Cl.
*H02K 5/00* (2006.01)

(52) U.S. Cl. ........................ 310/90; 310/91; 310/49 R; 310/89

(58) Field of Classification Search .............. 310/49 R, 310/91, 89, 90
See application file for complete search history.

(56) References Cited

U.S. PATENT DOCUMENTS

| | | | | |
|---|---|---|---|---|
| 3,397,531 A | * | 8/1968 | Dubois | ........................ 368/324 |
| 3,495,113 A | * | 2/1970 | Haydon | ........................ 310/164 |
| 4,107,559 A | * | 8/1978 | Patel | ........................ 310/49 R |
| 4,471,246 A | * | 9/1984 | Paillet | ........................ 310/90 |
| 4,645,361 A | * | 2/1987 | Lakin | ........................ 384/441 |
| 5,811,903 A | * | 9/1998 | Ueno et al. | ........................ 310/90 |
| 5,886,438 A | * | 3/1999 | Kawanishi | ........................ 310/90 |

* cited by examiner

*Primary Examiner*—Darren Schuberg
*Assistant Examiner*—Yahveh Comas
(74) *Attorney, Agent, or Firm*—Hogan & Hartson LLP

(57) ABSTRACT

A stepping motor includes a rotor with a permanent magnet, a rotary shaft extending from the rotor and a stator placed around the rotor. The stepping motor comprises a stator core placed on one end section in a motor axial line direction of the stator, a bearing plate that includes a bearing for rotatably supporting the rotary shaft and is placed at an end section of the stator adjacent to the stator core, and an end plate fixed to an end surface of the stator core on an outer circumference side of the bearing plate. The stator core includes a plurality of salient poles that bend in the motor axial line direction at an inner circumferential edge of the stator core to oppose the permanent magnet, and concave sections that recede in the radial direction and formed between the bent parts of the salient poles. The end plate is affixed to an end surface of the stator core on an outer circumference side of the bearing plate, wherein the bearing plate has a plurality of engaging sections that hook on the end surface of the stator core and a plurality of convex sections that protrude towards inside of the concave sections of the stator core and hook on an end surface of the end plate.

17 Claims, 10 Drawing Sheets

MOTOR WITH IMPROVED ROTARY SHAFT SUPPORTING STRUCTURE

BACKGROUND OF THE INVENTION

1. Field of the Invention

The present invention relates to a motor with a stator core whose salient poles bend at the inner circumferential edge in the motor axial line direction. More specifically, the present invention relates to a support structure for supporting a rotary shaft of a motor having such a structure.

2. Related Background Art

Figure 10:
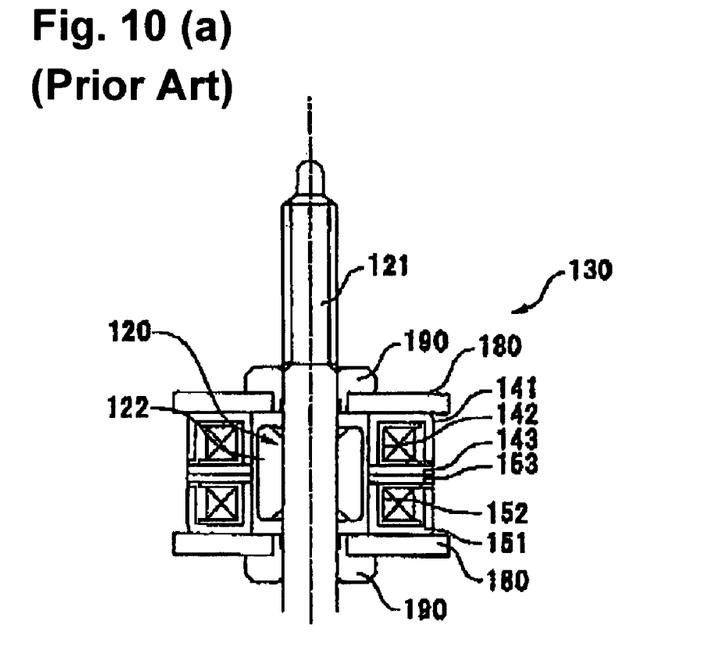

A PM-type stepping motor generally comprises, as shown in FIG. 10(a), a rotor 120 having a permanent magnet 122, a rotary shaft 121 that extends from the rotor 120, and a stator 130 placed to surround the rotor 120.

The stator 130 comprises a first bobbin 142 with a coil wound thereon, and a first outer stator core 141 and a first inner stator core 143, which are placed to interpose the first bobbin 142 from its top and bottom, as well as a second bobbin 152 with a coil wound thereon, and a second inner stator core 153 and a second outer stator core 151, which are placed to interpose the second bobbin 152 from its top and bottom. A plurality of salient poles is formed on both the first outer stator core 141 and the first inner stator core 143 along the inner circumferential surface of the first bobbin 142. Similarly, a plurality of salient poles is formed on the second outer stator core 151 and the second inner stator core 153 along the inner circumferential surface of the second bobbin 152.

On the stator 130 is mounted an end plate 180 on each of the outer side surfaces in the motor axial line direction of the first outer stator core 141 and the second stator core 151. A radial bearing 190 for the rotary shaft 121 is mounted on each end plate 180, and the radial bearings 190 protrude from the corresponding end plates 180 towards both of the end sides of the rotary shaft 121 including the output end side.

Alternatively, instead of a structure in which a radial bearing is mounted on the end plate 180, a PM-type stepping motor may have a structure as shown in FIG. 10(b), where, at a base end side 121a (i.e., on an opposite-to-output end side) of a rotary shaft 121, a radial bearing 191 is supported by a ring-shaped member 195 mounted on an outer side surface in the motor axial line direction of a second outer stator core 151. In such a structure, an end plate 160 is mounted on an outer side surface in the motor axial line direction of the ring-shaped member 195, and a leaf spring 161 formed on the end plate 160 causes the rotary shaft 121 to move towards an output end via the radial bearing 191 and a pivot 163. Although an end plate 180 is mounted on an end surface of a first outer stator core 141 even in a motor having such a structure, the end plate 180 serves to mount the motor to other equipment, and a large hole 185 is formed in the center of the end plate 180 for the rotary shaft 121 to penetrate.

In such PM-type stepping motors, due to the fact that the radial bearings 190 and 191 protrude in the motor axial line direction from the stator 130, the dimension of the motor's main body in the motor axial line direction becomes the dimension of the stator 130 plus at least the thickness of the radial bearings 190 or 191, which prevents the motor from being made thinner.

In the motor shown in FIG. 10(a), a process for fixing the bearings 190 to the end plates 180 through such methods as welding, caulking or adhesion, and a process to weld the end plate 180 to the first outer stator core 141 are conventionally required, which takes an enormous amount of time for assembly.

Furthermore, in such PM-type stepping motors, the positional precision in the radial direction of the bearings 190 and 191 are affected not only by the parts precision of the bearings 190 and 191 themselves and the parts precision of the stator cores 141 and 151 themselves, but also the parts precision of the end plates 180 and 160, the mounting precision of the bearings 190 and 191 to the end plates 180 and 160, and the mounting precision of the end plates 180 and 160 to the stator cores 141 and 151. For this reason, the positional precision in the radial direction of the bearings 190 and 191 is poor.

SUMMARY OF THE INVENTION

In view of the above, the present invention relates to a motor having a structure with which a thinner motor main body can be achieved and with which a bearing can be provided by performing welding, caulking or adhesion only once, through modification of the bearing structure.

Further, the present invention also relates to a motor with which positional precision of a bearing in the radial direction can be improved through modification of the bearing structure.

In accordance with an embodiment of the present invention, in a motor comprising a rotary shaft, which extends from a rotor with a permanent magnet and a stator placed around the rotor, a stator core placed at least on one end section in the motor axial line direction of the stator is provided with a plurality of salient poles, which are bent in the motor axial line direction at the inner circumferential edge to oppose the permanent magnet, and concave sections, which are depressed in the radial direction and formed between the bent parts of the salient poles; a bearing plate with a bearing that rotatably supports the rotary shaft is placed at the end section of the stator where the stator core is placed; and an end plate is fixed to an end surface of the stator core on the outer circumference side of the bearing plate, where the bearing plate has engaging sections that hook on the end surface of the stator core and first convex sections that protrude towards inside of the concave sections and hook on the end surface of the end plate.

According to the present invention, while the engaging sections of the bearing plate hook onto the end surface of the stator core at one end section in the motor axial line direction of the stator, the first convex sections of the bearing plate are gripped between the end surface of the stator core and the end plate within the concave sections that are formed between the bent parts of the salient poles in the stator core. For this reason, the bearing plate is bound by the end plate via the first convex sections towards the outside (i.e., the side opposite to the side where the rotor is positioned) in the motor axial line direction and bound by the stator core towards the inside (i.e., the side where the rotor is positioned) in the motor axial line direction. Consequently, although the structure is simple, the bearing plate is firmly fixed to the end section of the stator. As a result, there is no need to employ a structure in which a bearing protrudes significantly from an end plate in order to firmly fix the bearing to the end plate, and the motor can therefore be made thinner. Furthermore, when assembling the motor, after the bearing plate is interposed between the stator core and the end plate, only a single process of fixing the end plate to the stator core through welding, caulking or adhesion is required. Consequently, there is no need to perform time-consuming processes such as fixing the bearing plate to the end plate through such methods as welding, caulking, or adhesion, and then fixing the end plate to the stator core through such methods as welding, caulking or adhesion again.

According to the present invention, the bearing plate may preferably hold the bearing in its center position and tip end parts of the first convex sections may preferably abut inner ends of the concave sections. With this structure, the stator core and the bearing plate can be positioned directly. Furthermore, since the concave sections can be formed on the stator core with high positional precision through press machining, once the bearing plate is positioned using the concave sections as a reference, centering of the bearing can be done with high precision.

According to the present invention, the engaging sections may preferably be formed as second convex sections that protrude towards the outer circumference side from the bearing plate, and notches in which to mount the second concave sections may preferably be formed in the end plate at the circumferential edge of a hole where the bearing plate is placed. In other words, by forming the notches, in which are mounted the engaging sections of the bearing plate, in the end plate, the engaging sections of the bearing plate do not overlap the end plate in the motor axial line direction; makes it a possible to make the motor even thinner by at least the thickness of the engaging sections.

According to the present invention, the second convex sections may preferably project out towards the outer circumference side from the main body part of the bearing plate without bending in the motor axial line direction, and the first convex sections may preferably project out towards the outer circumference side after bending in the motor axial line direction. With such a structure, even if the end plate and the stator core grip the first convex sections between them, the motor can be made thinner by the amount of the bend in the first convex sections in the motor axial line direction.

According to the present invention, the outer end surface of the bearing plate may preferably be in a position more depressed than the outer end surface of the end plate in the motor axial line direction. With this structure, the bearing does not protrude from the end plate at all, thereby contributing significantly to making the motor thinner.

In accordance with another embodiment of the present invention, in a motor comprising a rotary shaft, which extends from a rotor with a permanent magnet, and a stator placed around the rotor according to the present invention, a stator core placed at least on one end section in the motor axial line direction of the stator is provided with a plurality of salient poles, which are bent in the motor axial line direction at the inner circumferential edge to oppose the permanent magnet, and concave sections, which are depressed in the radial direction and formed between the bent parts of salient poles; a bearing plate that holds a bearing that rotatably supports the rotary shaft is placed at the end section of the stator where the stator core is placed, where positioning convex sections, which position the bearing plate in the radial direction by having their tip end parts project into the concave sections of the stator core and abut inner end of the concave sections, are formed on the bearing plate.

According to the present invention, the tip end parts of the positioning convex sections of the bearing plate abut the inner end of the concave sections of the stator core, such that the positioning convex sections can directly position both the stator core end the bearing plate. In other words, since only the mounting precision of the bearing plate to the stator core affects the positional precision of the bearing aside from the precision of the bearing itself and the parts precision of the stator core itself, centering of the bearing can be done with high precision. Furthermore, since the concave sections can be formed on the stator core with high positional precision through press machining, once the bearing plate is positioned using the concave sections as a reference, centering of the bearing can be done with high precision.

According to the present invention, the bearing plate may preferably hold the bearing in its center position.

According to the present invention, the stator core may preferably be formed through press machining.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIGS. 4(a)–(i) show a plan view, a cross-sectional view and a bottom view of a state in which the end plate and the bearing plate shown in FIG. 3 are placed together; and a plan view, a cross-sectional view and a bottom view of a state in which the end plate and the bearing plate are mounted on the first outer stator core, respectively.

FIGS. 8(a) and (b) are a longitudinal cross-sectional view of a motor in accordance with a third embodiment of the present invention and an exploded cross-sectional view of a part of the motor, respectively.

FIGS. 10(a) and (b) are longitudinal cross-sectional views of conventional motors.

DESCRIPTION OF PREFERRED EMBODIMENTS

Motors in accordance with preferred embodiments of the present invention are described below with reference to the accompanying drawings.

First Embodiment

Figure 1:
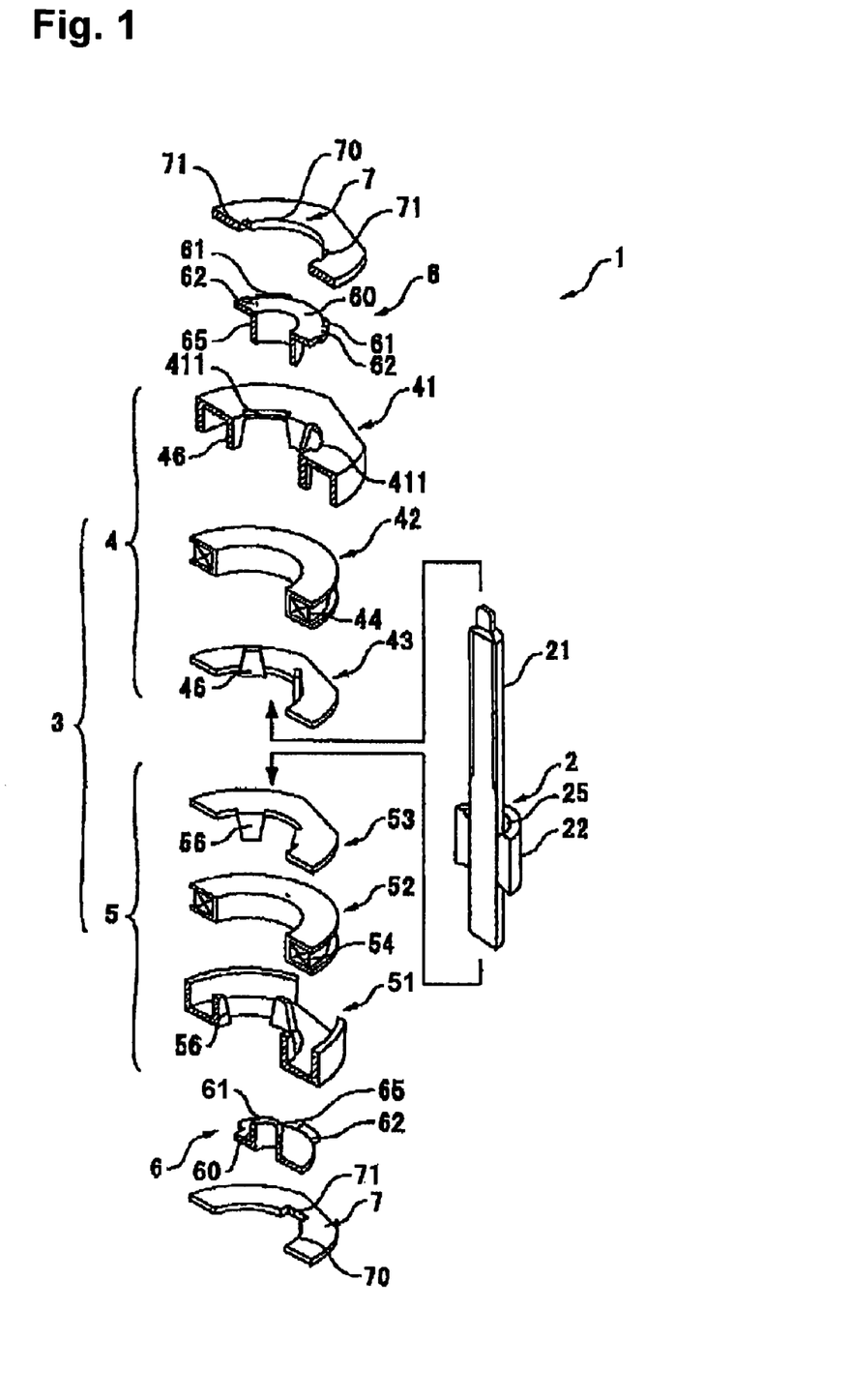
FIG. 1 shows an exploded perspective view of a motor in accordance with a first embodiment of the present invention.
Figure 2:
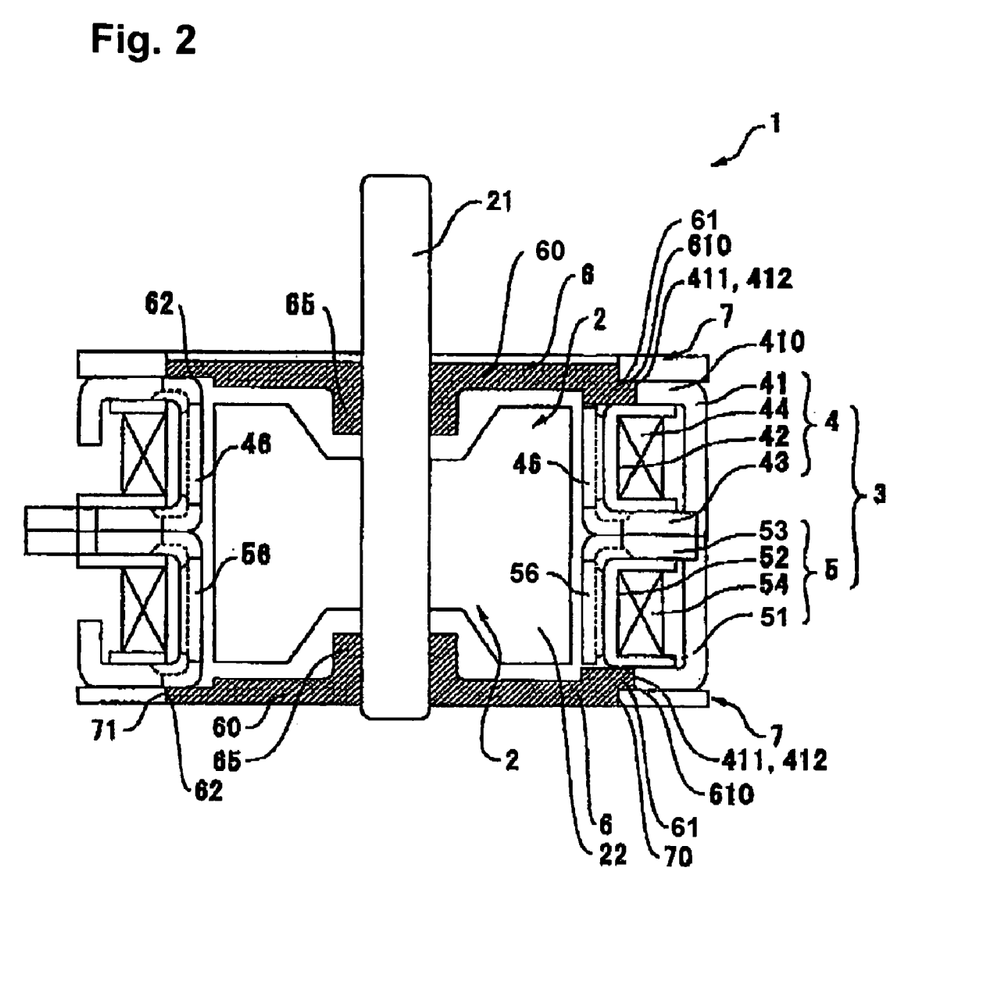
FIG. 2 shows a longitudinal cross-sectional view of the motor shown in FIG. 1.
Figure 3:
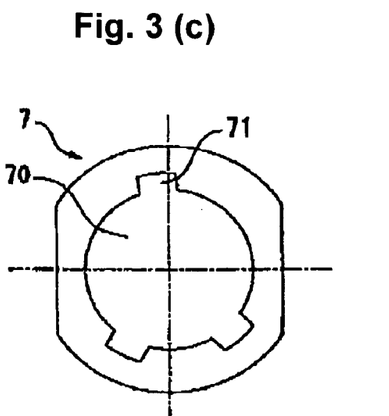
FIGS. 3(a)–(i) show a plan view, a cross-sectional view and a bottom view of an end plate; a plan view, a cross-sectional view and a bottom view of a bearing plate; and a plan view, a cross-sectional view and a bottom view of a first outer stator core, respectively, all used in the motor shown in FIGS. 1 and 2.

FIGS. 1 and 2 are an exploded perspective view and a longitudinal cross-sectional view, respectively, of a motor according to the first embodiment of the present invention. FIGS. 3(a)–(i) are a plan view, a cross-sectional view and a bottom view of an end plate; a plan view, a cross-sectional view and a bottom view of a bearing plate; and a plan view, a cross-sectional view and a bottom view of a first outer stator core, all used in the motor shown in FIGS. 1 and 2, respectively. FIGS. 4(a)–(f) are a plan view, a cross-sectional view and a bottom view of a state in which the end plate and the bearing plate shown in FIG. 3 are placed together, and a plan view, a cross-sectional view and a bottom view of a state in which the end plate and the bearing plate are mounted on the first outer stator core, respectively.

As shown in FIGS. 1 and 2, a stepping motor 1 according to the present embodiment is a PM-type stepping motor and comprises a rotor 2 with a permanent magnet 22, a rotary shaft 21 that extends from the rotor 2, and a stator 3 placed to surround the rotor 2. The rotor 2 is formed on a base end side (i.e., on an opposite-to-output end side), with its output end side significantly projecting out.

The stator 3 comprises a first stator assembly 4 and a second stator assembly 5. Of the stator assemblies 4 and 5, the first stator assembly 4 positioned in the upper stage (in the figure) comprises a first outer stator core 41, a first bobbin 42 with a coil 44 wound around, and a first inner stator core 43. The first bobbin 42 is interposed between the first inner stator core 43 and the first outer stator core 41. Along the inner circumferential surface of the first bobbin 42 is a plurality of salient poles 46 formed on both the first outer stator core 41 and the first inner stator core 43. The second stator assembly 5 positioned in the lower stage (in the figure) comprises a second outer stator core 51, a second bobbin 52 with a coil 54 wound around, and a second inner stator core 53. The second bobbin 52 is interposed between the second inner stator core 53 and the second outer stator core 51. Along the inner circumferential surface of the second bobbin 52 is a plurality of salient poles 56 formed on both the second outer stator core 51 and the second inner stator core 53.

In the stepping motor 1 having such a structure, the rotary shaft 21 is supported on both sides, and the support structure is as described in detail below. According to the present embodiment, the support structures at the output end side and on the opposite-to-output end side in a motor axial line direction may be the same. In the following description, therefore, the structure on the output end side is primarily described.

According to the present embodiment, the first outer stator core 41 positioned at an end section of the stator 3 is provided with five salient poles 46 that bend in the motor axial line direction at the inner circumferential edge of an end surface 410 to oppose the permanent magnet 22 (see FIGS. 1 and 2), wherein five concave sections 411 that are depressed in the radial direction are formed at a uniform angle and interval between the bent parts of the salient poles 46, as shown in FIGS. 2 and 3(g)–(i).

As shown in FIGS. 2 and 3(d)–(f), at one end section of the stator 3 is placed a bearing plate 6, which has a cylindrical bearing 65 extending downward to rotatably support the rotary shaft 21. The bearing plate 6 is a disk-shaped resin mold member provided with a generally circular main body part 60, five first convex sections 61 (i.e., positioning convex parts) that protrude towards the outer circumference side from the main body part 60, and three second convex sections 62 (i.e., engaging sections) that protrude towards the outer circumference side from the main body part 60.

Of the convex sections 61 and 62, the second convex sections 62 protrude out more towards the outer circumference side than the first convex sections 61. Furthermore, while the second convex sections 62 project out from the main body part 60 towards the outer circumference side without bending in the motor axial line direction, the first convex sections 61 project out towards the outer circumference side after bending slightly inward (in the direction where the rotor 2 is positioned) in the motor axial line direction.

As shown in FIGS. 2 and 3(a)–(c), a ring-shaped, metal end plate 7 is placed around the periphery of the bearing plate 6 at an end section of the stator 3, where the end plate 7 is affixed to the end surface 410 of the first outer stator core 41 through, for example, welding. On the end plate 7 is formed a hole 70 with a shape that corresponds to the outer circumferential outline of the bearing plate 6 except for the first convex sections 61, and along the circumferential edge of the hole 70 are formed three notches 71 in positions that correspond to the second convex sections 62.

Figure 4:
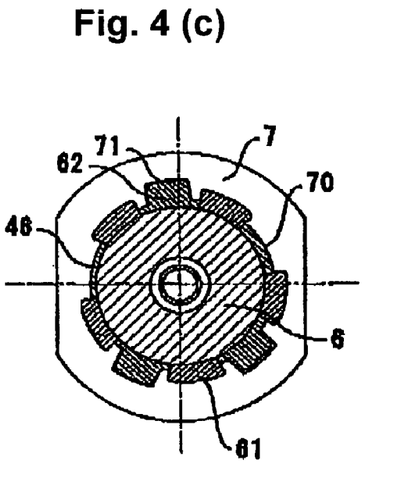

In assembling the stepping motor 1 using such members, the bearing plate 6 and the end plate 7 are first placed one on top of the other, as shown in FIGS. 4(a)–(c), according to the present embodiment. As a result, the second convex sections 62 of the bearing plate 6 become inserted in the notches 71 of the end plate 7.

Next, after the rotary shaft 21 is inserted into the bearing 65 of the bearing plate 6 in this state, the bearing plate 6 and the end plate 7 are placed on the end surface 410 of the first outer stator core 41 and positioned so that the first convex sections 61 of the bearing plate 6 are inserted in the concave sections 411 of the first outer stator core 41. By positioning in this way, tip end parts 610 of the first convex sections 61 abut inner ends 412 of the concave sections 411. The positioning of the bearing plate 6 in the radial direction takes place in this way.

Next, the end plate 7 and the end surface 410 of the first outer stator core 41 are welded and fixed together.

As a result, at the end section in the motor axial line direction of the stator 3, while the second convex sections 62 of the bearing plate 6 become hooked on the end surface 410 of the first outer stator core 41, the first convex sections 61 of the bearing plate 6 are held by the end surface 410 of the stator core 41 and the end plate 7 in the concave sections 411 that are formed between the bent parts of the salient poles 46 in the stator core 41.

The end plate 7 and the bearing plate 6 with the bearing 65 are placed at the second outer stator core 51 also, but since this structure is identical to the structure of the first outer stator core 41, its description is omitted.

As described above, according to the present embodiment, the bearing plate 6 is bound by the end plate 7 via the first convex sections 61 towards the outside (i.e., the side opposite to the side were the rotor 2 is positioned) in the motor axial line direction and bound by the first outer stator core 41 towards the inside (i.e., the side where the rotor 2 is positioned) in the motor axial line direction. Consequently, although the structure is simple, the bearing plate 6 is firmly fixed to the end section of the stator 3. Furthermore, the outer end surface of the bearing plate 6 is recessed from the end plate 7. As a result, a structure in which the bearing 65 juts out significantly from the end plate 7 does not have to be employed, which makes it possible to make the motor thinner.

Although the bearing 65 juts out towards the rotor 2, this does not cause any interference with the rotation of the rotor 2 due to the fact that the end surface of the rotor 2 is recessed to avoid the bearing 65.

When assembling the stepping motor 1, after the bearing plate 6 is interposed between the first outer stator core 41 and the end plate 7, only a single process of fixing the end plate 7 to the first outer stator core 41 through welding, caulking or adhesion is required. Consequently, there is no need to perform time-consuming processes such as fixing the bearing plate 6 to the end plate 7 through such methods as welding, caulking or adhesion, and then fixing the end plate 7 to the first outer stator core 41 through such methods as welding, caulking or adhesion again.

According to the present invention, the bearing plate 6 has the bearing 65 in its center position, and the tip end parts 610 of the first convex sections 61 abut the inner ends 412 of the concave sections 411. These allow the first outer stator core 41 and the bearing plate 6 to be directly positioned. Furthermore, since the concave sections 411 can be formed on the first outer stator core 41 with high positional precision through press machining, once the bearing plate 6 is positioned using the concave sections 411 as a reference, centering of the bearing 65 can be done with high precision.

In addition, due to the fact that the notches 71 in which to mount the second convex sections 62 are formed on the circumferential edge of the hole 70 in which the bearing plate 6 is placed, the second convex sections 62 of the bearing plate 6 do not overlap the end plate 7 in the motor axial line direction. As a result, the stepping motor 1 can be made thinner by at least the thickness of the second convex sections 62.

Moreover, while the second convex sections 62 project out towards the outer circumference side from the main body part 60 of the bearing plate 6 without bending in the motor axial line direction, the first convex sections 61 project out towards the outer circumference side after bending in the motor axial line direction. Consequently, even if the structure were such that the end plate 7 and the first outer stator core 41 grip the first convex sections 61 between them, the stepping motor 1 can be made thinner by the amount of the bend in the first convex sections 61 in the motor axial line direction. For example, the stepping motor 1 having a structure in which the end surface of the bearing 65 is in a position more depressed in the motor axial line direction than the outer side end surface of the end plate 7 can be realized.

Since the length dimension of the permanent magnet 22 does not limit the installation of the bearing 65, the length dimension of the permanent magnet 22 does not have to be shortened. Consequently, the stepping motor 1 having a large torque can be formed.

Second Embodiment

Figure 5:
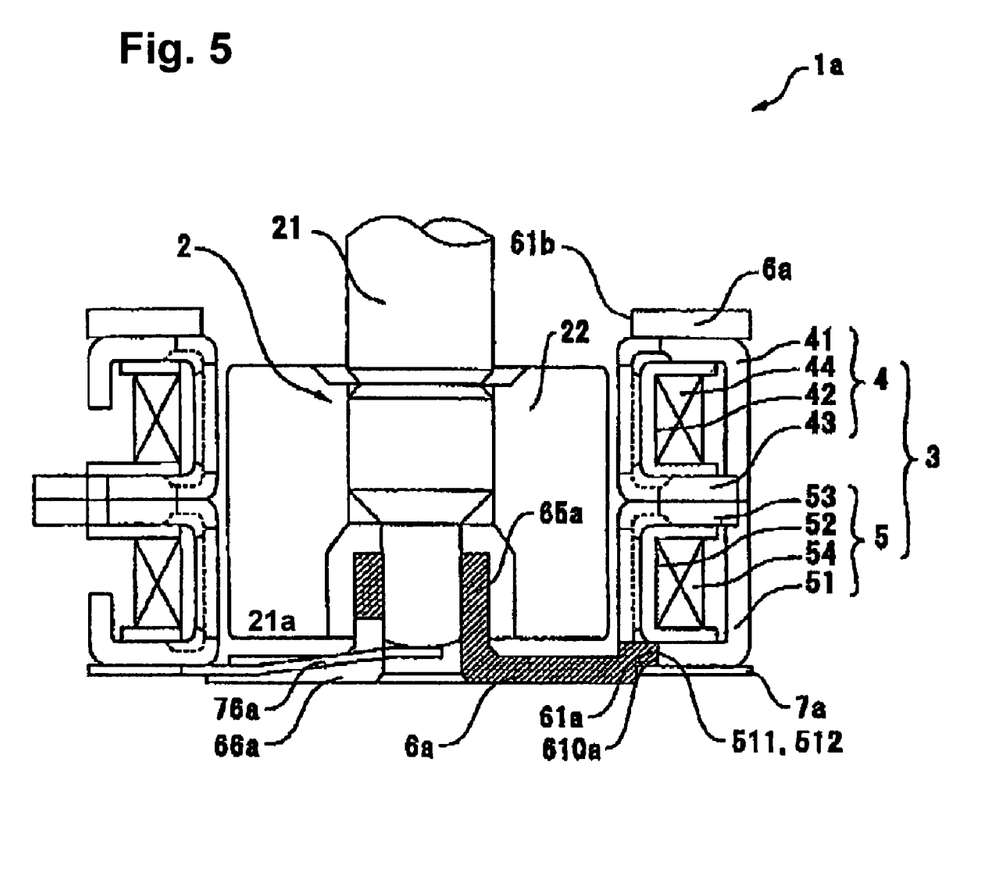
FIG. 5 shows a longitudinal cross-sectional view of a motor according to the second embodiment.
Figure 6:
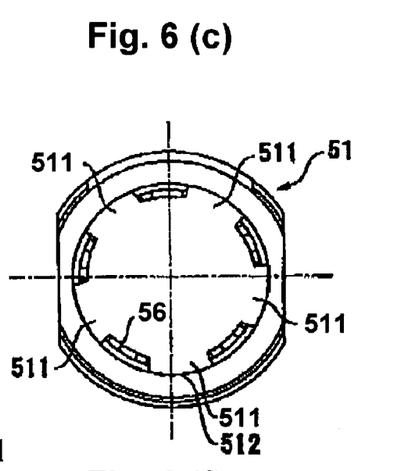
FIGS. 6(a)–(i) show a plan view, a cross-sectional view and a bottom view of a second outer stator core; a plan view, a cross-sectional view and a bottom view of a bearing plate; and a plan view, a cross-sectional view and a bottom view of an end plate, all used in the motor shown in FIG. 5.

FIG. 5 is a longitudinal cross-sectional view of a motor in accordance with a second embodiment of the present invention. FIGS. 6(a)–(i) are a plan view, a cross-sectional view and a bottom view of a second outer stator core; a plan view, a cross-sectional view and a bottom view of a bearing plate; and a plan view, a cross-sectional view and a bottom view of an end plate, respectively, all used in the motor shown in FIG. 5. FIGS. 7(a)–(f) are a plan view, a cross-sectional view and a bottom view of a state in which the end plate and the bearing plate shown in FIG. 6 are placed together, and a plan view, a cross-sectional view and a bottom view of a state in which the end plate and the bearing plate are mounted on the second outer stator core, respectively.

As shown in FIG. 5, a stepping motor 1a according to the present embodiment is a PM-type stepping motor like the motor according to the first embodiment and comprises a rotor 2 with a permanent magnet 22, a rotary shaft 21 that extends from the rotor 2, and a stator 3 placed to surround the rotor 2. The rotor 2 is formed on a base end side (i.e., on an opposite-to-output end side) of the rotary shaft 21, with its output end side significantly projecting out.

The stator 3 comprises a first stator assembly 4 and a second stator assembly 5. Of the stator assemblies 4 and 5, the first stator assembly 4 positioned in the upper stage comprises a first outer stator core 41, a first bobbin 42 with a coil 44 wound around, and a first inner stator core 43. The first bobbin 42 is interposed between the first inner stator core 43 and the first outer stator core 41, wherein along the inner circumferential surface of the first bobbin 42 is a plurality of salient poles 46 formed on both the first outer stator core 41 and the first inner stator core 43. The second stator assembly 5 positioned in the lower stage comprises a second outer stator core 51, a second bobbin 52 with a coil 54 wound around, and a second inner stator core 53. The second bobbin 52 is interposed between the second inner stator core 53 and the second outer stator core 51, wherein along the inner circumferential surface of the second bobbin 52 is a plurality of salient poles 56 formed on both the second outer stator core 51 and the second inner stator core 53.

In the stepping motor 1a according to the present embodiment, the rotary shaft 21 has a cantilevered support, so that only a base end side 21a of the rotary shaft 21 is supported. In other words, in the stepping motor 1a according to the present embodiment, although an end plate 6b is fixed to the first outer stator core 41, the end plate 6b only has a large hole 61b formed therein for the rotary shaft 21 to penetrate and does not contribute to supporting the rotary shaft 21.

In contrast, a support mechanism as described below is formed on the base end side 21a of the rotary shaft 21.

According to the present embodiment, the second outer stator core 51 positioned at an end section in the motor axial line direction of the stator 3 is provided with five salient poles 56 that bend in the motor axial line direction at the inner circumferential edge of an end surface 510 to oppose the permanent magnet 22 (see FIG. 5), where five concave sections 511 that are recessed in the radial direction are formed at a uniform angle and interval between the bent parts of the salient poles 56, as shown in FIGS. 5 and 6(a)–(c).

As shown in FIG. 5 and FIGS. 6(d)–(f), at one end section of the stator 3 is placed a bearing plate 6a, which has a bearing 65a that rotatably supports the rotary shaft 21. The bearing plate 6a is a disk-shaped resin mold member provided with a generally circular main body part 60a, four first convex sections 61a (i.e., positioning convex parts) that protrude towards the outer circumference side from the main body part 60a, and three second convex sections 62a that protrude towards the outer circumference side from the main body part 60a.

The second convex sections 62a protrude more towards the outer circumference side than the first convex sections 61a. Furthermore, while the second convex sections 62a project out from the main body part 60a towards the outer circumference side without bending in the motor axial line direction, the first convex sections 61a project out towards the outer circumference side after bending slightly inward (in the direction where the rotor 2 is positioned) in the motor axial line direction.

As shown in FIGS. 5 and 6(g)–(i), a thin, metal end plate 7a is placed around the periphery of the bearing plate 6a at an end section of the stator 3, where the end plate 7a is fixed to the end surface 510 of the second outer stator core 51 through an appropriate method such as welding. In the end plate 7a is formed a hole 70a with a shape that generally corresponds to the outer circumferential outline of the bearing plate 6a except for the first convex sections 61a, and along the circumferential edge of the hole 70a are formed three notches 71a in positions that correspond to the second convex sections 62a. Furthermore, on the end plate 7a is formed a leaf spring 76a that reaches the bearing 65a of the bearing plate 6a from the inner circumferential edge of the hole 70a, where the leaf spring 76a has a function to move the rotary shaft 21 towards the output end side, as shown in FIG. 5.

Figure 7:
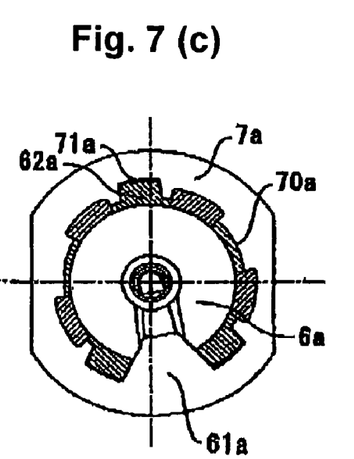
FIGS. 7(a)–(f) show a plan view, a cross-sectional view and a bottom view of a state in which the end plate and the bearing plate shown in FIG. 6 are placed together, and a plan view, a cross-sectional view and a bottom view of a state in which the end plate and the bearing plate are mounted on the second outer stator core.

In assembling the stepping motor 1a using such members, the bearing plate 6a and the end plate 7a are first placed one on top of the other, as shown in FIGS. 7(a)–(c), according to the present embodiment. As a result, the second convex sections 62a of the bearing plate 6a become inserted in the notches 71a. Further, the leaf spring 76a of the end plate 7a passes through a groove 66a of the bearing plate 6a to reach the bearing 65a.

Next, as shown in FIGS. 7(d)–(f), the bearing plate 6a and the end plate 7a are placed on the end surface 510 of the second outer stator core 51 and positioned so that the first convex sections 61a of the bearing plate 6a are mounted in the concave sections 511 of the second outer stator core 51. By positioning in this way, tip end parts 610a of the first convex sections 61a abut inner ends 512 of the concave sections 511.

Next, the end plate 7a and the end surface 510 of the second outer stator core 51 are welded and fixed together.

As a result, at the end section in the motor axial line direction of the stator 3, while the second convex sections 62a of the bearing plate 6a become hooked on the end surface 510 of the second outer stator core 51, the first convex sections 61a of the bearing plate 6a are held between the end surface 510 of the stator core 51 and the end plate 7a in the concave sections 511 that are formed between the bent parts of the salient poles 56 in the stator core 51.

As described above, according to the present embodiment as in the first embodiment, the bearing plate 6a is bound by the end plate 7a via the first convex sections 61a towards the outside (i.e., the side opposite to the side where the rotor 2 is positioned) in the motor axial line direction and bound by the second outer stator core 51 towards the inside (i.e., the side where the rotor 2 is positioned) in the motor axial line direction. Consequently, although the structure is simple, the bearing plate 6a is firmly fixed to the end section of the stator 3. As a result, a structure in which the bearing juts out significantly from the end plate in order to firmly fix the bearing to the end plate does not have to be employed, which makes it possible to make the motor thinner. Furthermore, when assembling the stepping motor 1a, after the bearing plate 6a is interposed between the second outer stator core 51 and the end plate 7a, the end plate 7a is fixed to the second outer stator core 51 through an appropriate method such as welding, caulking or adhesion. Consequently, an effect similar to the first embodiment can be achieved, i.e., there is no need to perform time-consuming processes such as fixing the bearing plate 6a to the end plate 7a through such a method as welding, caulking or adhesion, and then fixing the end plate 71 to the second outer stator core 51 through such a method as welding, caulking or adhesion again.

According to the second embodiment of the present invention like in the first embodiment, the bearing plate 6a has the bearing 65a in its center position, and the tip end parts 610a of the first convex sections 61a abut the inner ends 512 of the concave sections 511. These allow the second outer stator core 51 and the bearing plate 6a to be directly positioned. Furthermore, since the concave sections 511 can be formed on the second outer stator core 51 with high positional precision through press machining, once the bearing plate 6a is positioned using the concave sections 511 as a reference, centering of the bearing 65a can be done with high precision, which is another effect similar to the effect achieved in the first embodiment.

Third Embodiment

Figure 8:
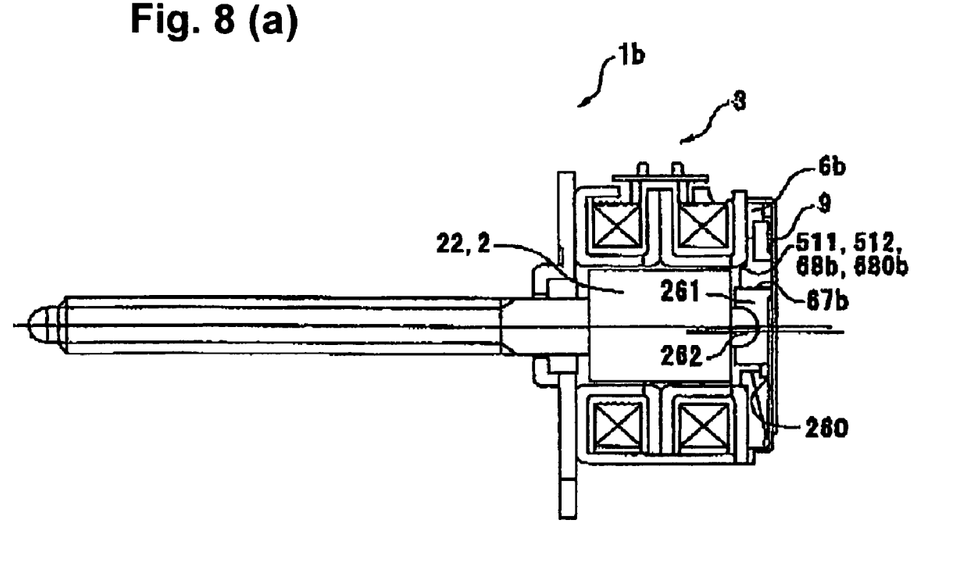
Figure 9:
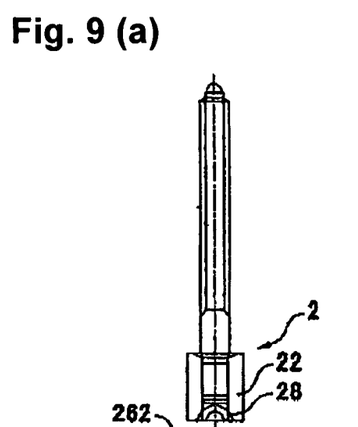
FIGS. 9(a)–(h) show a side view of a rotor, a side view of a steel ball, a plan view of a slide bearing (a bearing member), a bottom view of an outer stator core placed opposite to an output end, a plan view of a bearing plate holding the bearing member, a bottom view of the slide bearing, a bottom view of the bearing plate, and a bottom view of a leaf spring, all used in the motor shown in FIGS. 8(a) and (b), respectively.

The present invention is also applicable to a stepping motor having a structure shown in FIGS. 8 and 9 among stepping motors whose rotary shaft has a cantilevered structure.

FIGS. 8(a) and (b) are a longitudinal cross-sectional view of a motor in accordance with another embodiment of the present invention and an exploded cross-sectional view of a part of the motor, respectively. FIGS. 9(a)–(h) are a side view of a rotor, a side view of a steel ball, a plan view of a slide bearing (a bearing member), a bottom view of an outer stator core placed opposite to an output end, a plan view of a bearing plate holding the bearing member, a bottom view of the slide bearing, a bottom view of the bearing plate, and a bottom view of a leaf spring, respectively, all used in the motor shown in FIG. 8.

In FIGS. 8(a) and 8(b) and FIGS. 9(a)–(h), a stepping motor 1b according to the present embodiment includes a rotor 2, a steel ball 262, which is mounted in a concave section 28 formed on an end surface of the rotor 2, and a slide bearing 261 (a bearing), which rotatably supports the rotor 2 via the steel ball 262, which are placed on an end section opposite to an output end side of the rotor 2. On the slide bearing 261, three protrusions 260 protrude at a uniform angle and interval at a bottom end section.

A bearing plate 6b is mounted at an end section of the stator 3. The bearing plate 6b is provided with a support hole 67b whose inner diameter dimension is larger than the outer diameter dimension of the slide bearing 261. The slide bearing 261 is inserted and held in the support hole 67b.

On the bearing plate 6b are formed five positioning convex sections 68b at a uniform angle and interval on the periphery of the support hole 67b. In the meantime, a second outer stator core 51 positioned at an end section in the motor axial line direction of the stator 3 has five salient poles 56, which are bent in the motor axial line direction at the inner circumferential edge of an end surface 510 to oppose a permanent magnet 22, and five concave sections 511, which are depressed in the radial direction between the bent parts of the salient poles 56 and formed at a uniform angle and interval. When the positioning convex sections 68b of the bearing plate 6b are mounted in the concave sections 511, tip end sections 680b of the positioning convex sections 68b abut inner ends 512 of the concave sections 511, thereby positioning the bearing plate 6b.

In addition, three holes 69b are formed in the bearing plate 6b at a uniform angle and interval. The three protrusions 260 of the slide bearing 261 are inserted in the three holes 69b when the slide bearing 261 is inserted in the support hole 67b from the bottom.

Since the slide bearing 261 is movable in the axial line direction within the support hole 67b, a leaf spring 9 is mounted on the outside of the bearing plate 6b. The leaf spring 9 fixes the bearing plate 6b to the stator 3 and moves the slide bearing 261 in the axial line direction. More specifically, the leaf spring 9 is formed from a spring member including three narrow leaf springs 91, 92 and 93 that are cut and raised on its surface, where each of the three leaf springs 91, 92 and 93 moves the corresponding protrusion 260 of the slide bearing 261 towards the output side.

Even with the stepping motor 1b having such a structure, the bearing plate 6b holds the slide bearing 261 as a bearing member in its center position, and the tip end parts 680b of the positioning convex sections 68b abut the inner ends 512 of the concave sections 511. These allow the second outer stator core 51 and the bearing plate 6b to be directly positioned. Furthermore, since the concave sections 511 can be formed on the second outer stator core 51 with high positional precision through press machining, once the bearing plate 6b is positioned using the concave sections 511 as a reference, centering of the slide bearing 261 can be done with high precision; this is an effect similar to the effect achieved in the first embodiment.

As described above, according to the present invention, while engaging sections of a bearing plate hook onto an end surface of a stator core at one end section in the motor axial line direction of a stator, first convex sections of the bearing plate are held between the end surface of the stator core and an end plate within concave sections that are formed between bent parts of salient poles in the stator core. For this reason, the bearing plate is bound by the end plate via the first convex sections towards the outside (i.e., the side opposite to the side where a rotor is positioned) in the motor axial line direction and bound by the stator core towards the inside (i.e., the side where the rotor is positioned) in the motor axial line direction. Consequently, although the structure is simple, the bearing plate is firmly fixed to the end section of the stator. As a result, there is no need to employ a structure in which a bearing juts out significantly from an end plate in order to firmly fix the bearing to the end plate, and the motor can be made thinner. Furthermore, when assembling the motor, after interposing the bearing plate between the stator core and the end plate, the end plate can be fixed to the stator core through an appropriate method such as welding, caulking or adhesion. Consequently, there is no need to perform time-consuming processes such as fixing the bearing to the end plate through such a method as welding, caulking or adhesion, and then fixing the end plate to the stator core through such a method as welding, caulking or adhesion again.

Furthermore, according to the present invention, due to the fact that tip end parts of positioning convex sections of a bearing plate abut inner ends of concave sections of a stator core, the positioning convex sections can directly position both the stator core and the bearing plate. In other words, since only the mounting precision of the bearing plate to the stator core affects the positional precision of the bearing aside from the precision of the bearing itself and the parts precision of the stator core itself, centering of the bearing can be done with high precision. Furthermore, since the concave sections can be formed on the stator core with high positional precision through press machining, once the bearing plate is positioned using the concave sections as a reference, centering of the bearing can be done with high precision.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor having a rotor with a permanent magnet, a rotary shaft extending from the rotor and a stator placed around the rotor, the motor comprising:

a stator core placed at least on one end section in a motor axial line direction of the stator, the stator core including a plurality of salient poles that bend in the motor axial line direction at an inner circumferential edge of the stator core to oppose the permanent magnet, and concave sections that recede in the radial direction and formed between the bent parts of the salient poles;

a bearing plate that includes a cylindrical bearing in a center thereof that is integrally extended from the bearing plate for rotatably supporting the rotary shaft, the bearing plate being placed at an end section of the stator adjacent to the stator core; and an end plate fixed to an end surface of the stator core on an outer circumference side of the bearing plate, wherein the bearing plate has a plurality of engaging sections that hook on the end surface of the stator core and engage with an end face of the stator core in the axial direction, and a plurality of first convex sections that protrude towards inside of the concave sections of the stator core and hook on an end surface of the end plate, the first convex sections being held at the end surface of the stator core and the end surface of the end plate within the concave sections and having tip end parts engaged with the end plate in the axial direction, and wherein the bearing plate is fixed in the axial direction such that movement of the bearing plate on a stator core side is prevented by the stator core and movement of the bearing plate on an end elate side is prevented by the end plate.

2. A motor according to claim 1, wherein the engaging sections of the bearing plate do not overlap the end plate in the motor axial line direction.

3. A motor according to claim 2, wherein the first convex sections of the bearing plate overlap the end plate in the motor axial line direction.

4. A motor according to claim 1, wherein the engaging sections define a plurality of second convex sections that protrude outwardly from the bearing plate, and the end plate defines a hole to receive the bearing plate therein and has notches that receive the second concave sections at a circumferential edge of the hole.

5. A motor according to claim 4, wherein the second convex sections of the bearing plate do not overlap the end plate in the motor axial line direction.

6. A motor according to claim 4, wherein the first convex sections of the bearing plate overlap the end plate in the motor axial line direction.

7. A motor according to claim 4, wherein the bearing plate includes a main body part and the second convex sections project outwardly in a radial direction of the stator from the main body part without bending in the motor axial line direction.

8. A motor according to claim 7, wherein the first convex sections extend in the motor axial line direction from the main body part and then extend outwardly in the radial direction of the stator.

9. A motor according to claim 1, wherein an outer end surface of the bearing plate is in a position more recessed than an outer end surface of the end plate in the motor axial line direction.

10. A motor according to claim 9, wherein the bearing of the bearing plate does not protrude from the end plate outwardly in the motor axial line direction.

11. A motor having a rotor with a permanent magnet, a rotary shaft extending from the rotor and a stator placed around the rotor, the motor comprising:
 a stator core placed at least on one end section in a motor axial line direction of the stator, the stator core including a plurality of salient poles that bend in the motor axial line direction at an inner circumferential edge of the stator core to oppose the permanent magnet, and concave sections that recede in the radial direction and formed between the bent parts of the salient poles; and
 a bearing plate that includes a cylindrical bearing in a center thereof that is integrally extended from the bearing plate for rotatably supporting the rotary shaft, the bearing plate being placed at an end section of the stator adjacent to the stator core,
 wherein the bearing plate includes a plurality of engaging sections that engage with an end face of the stator core in an axial direction, and a plurality of positioning convex sections that project into the concave sections of the stator core and abut inner ends of the concave sections, the positioning convex sections having tip end parts that are engaged with an end plate fixed to an end surface of the stator core on an outer circumference side of the bearing plate in the axial direction, and
 wherein the bearing plate is fixed in the axial direction such that movement of the bearing plate on a stator core side is prevented by the stator core and movement of the bearing plate on an end plate side is prevented by the end plate.

12. A motor according to claim 11, wherein the tip end parts abut the inner end of the concave sections to thereby position the bearing plate in the radial direction with respect to the stator core.

13. A motor according to claim 11, wherein the stator core is formed by press processing.

14. A motor according to claim 11, wherein the engaging sections that extend in a radial direction of the stator, and the end plate includes a plurality of notches that engages the engaging sections of the bearing plate.

15. A motor according to claim 14, wherein the bearing plate includes a main body part, and the positioning convex sections extend in the motor axial line direction from the main body part and then extend outwardly in the radial direction of the stator.

16. A motor according to claim 15, wherein an outer end surface of the bearing plate is in a position more recessed than an outer end surface of the end plate in the motor axial line direction.

17. A motor according to claim 15, wherein the end plate includes a hole section that receives the bearing plate wherein the positioning convex sections extend outside of the hole section of the bearing plate in the radial direction and on an inside of the end plate.

* * * * *